3,269,517
FREE DISCHARGE HEAD FOR A
VERTICAL AUGER
Robert F. Skelton, Bluffton, Ind., assignor to Mix-Mill,
Inc., Bluffton, Ind., a corporation of Indiana
Filed Nov. 30, 1964, Ser. No. 414,600
5 Claims. (Cl. 198—64)

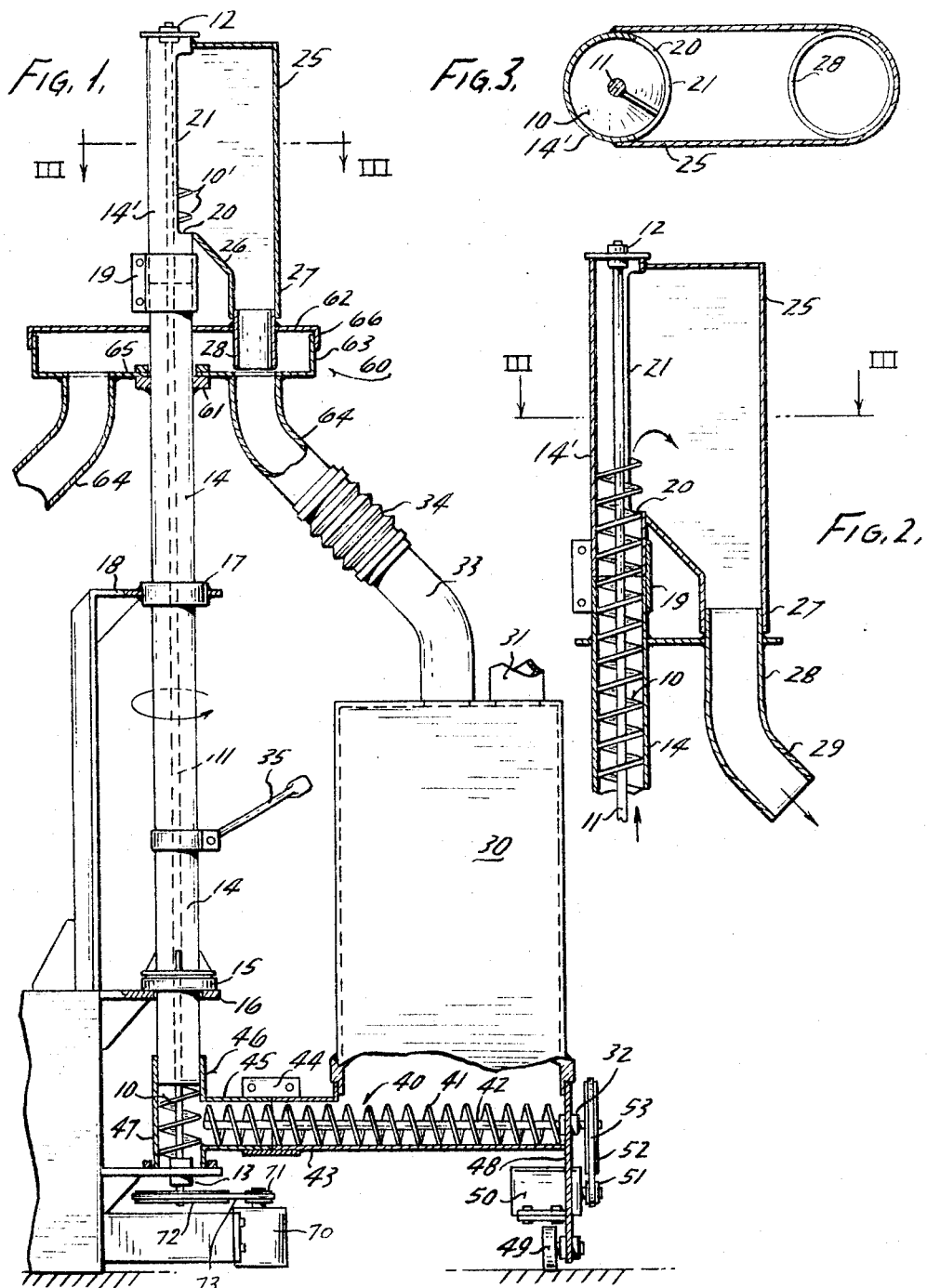

This application relates to a free discharge head for a vertical auger.

A major object of the invention is to provide a vertical auger having a discharge arrangement which substantially reduces the resistance of particulate material to passage through the discharge opening, thereby reducing the power requirements of the auger. A further purpose of the invention is to provide mechanism for use with a vertical auger conveyor which is so supported and arranged as to make the vertical auger usable both for mixing the material conveyed by recirculating it to and from a bin, and also using the same vertical auger as a conveyor to distribute the material to any one of a plurality of discharge spouts leading to other storage bins or to the point of use or the like. A further object of the invention is to provide a storage bin for use with a vertical auger as above described which may be positioned freely about the center of the auger.

A critical feature of the construction of the device of this invention is the provision of a discharge opening at the top of the vertical auger conveyor in which the opening extends past some of the flights of the conveyor and further extends several times as far beyond the end of the conveyor flights so that material being conveyed leaves the auger both at the side and at the end. Depending on the exact shape of the collecting chamber which gathers and directs the material from the top of the conveyor, the discharge opening may be made by cutting away the side of the tube, or if the space enclosed by the chamber completely surrounds the tube, the tube may terminate short of the end of the auger and well below the end of the shaft which carries the auger flights. Either arrangement produces a very marked reduction in the power requirements of the auger because of the ease with which material may escape from both the sides and the ends of the auger flights.

Subsidiary, but important, features of the invention include the mounting of the vertical auger tube for rotation to direct the material discharged from the auger, the distributor having a plurality of discharge spouts, the rotatable T connecting the lateral auger with the vertical auger, and the mounting of the bin connected with the lateral auger so that it may be moved about the axis of the vertical auger.

In the drawings:

FIG. 1 is a side elevational view of the device of my invention with portions broken away.

FIG. 2 is an enlarged cross-sectional view of a modification of the device shown in FIG. 1.

FIG. 3 is a cross-sectional view on line III—III of FIG. 1 or through a corresponding portion of FIG. 2.

The drawings show a vertical auger 10 on a shaft 11 which is rotatably mounted in an upper bearing 12 and a lower bearing 13. A tube 14 encloses the auger 10. The tube 14 is supported on a ring 15 which bears on a horizontal bracket having a plate 16 which encircles the tube 14 and underlies ring 15 leaving tube 14 free to rotate. Additional supporting rings 17 which encircle the tube 14 but are not fastened thereto may be provided as needed to insure vertical alignment of the tube, and these may be supported in any appropriate manner as, for instance, by bracket 18.

Auger 10 is driven by a motor 70, pulleys 71 and 72, and a belt 73.

The upper end of tube 14 comprises a portion 14' which may be unitary with tube 14 or may be a separate short tube of the same diameter secured to the main portion of tube 14 with a clamp 19. The upper portion of the tube is cut away to leave an opening 21 beginning at 20 adjacent the flights of auger 10 so as to expose one or more flights 10' at the end of the auger. The opening 21 in tube 14 continues upwardly beyond auger 10 to a height of approximately twice the axial length of auger flights 10'.

A collecting chamber 25 is constructed about opening 20 in tube portion 14'. In its simplest form, this collecting chamber is U-shaped, with the legs of the "U" and the top and bottom of the chamber welded to tube 14' adjacent the vertical edges of opening 20. The bottom 26 of chamber 25 slopes downwardly from the lower edge of opening 20 to a first discharge spout 27. A variety of connecting fittings may be attached to discharge spout 27, such as the straight duct 28, with or without an elbow 29, depending upon the needs of the particular installation. In the arrangement shown in FIG. 1, the discharge spout 27 is sending the conveyed material back into the bin from which it was originally withdrawn. In that manner, the material in the bin is mixed, so that a charge of several different kinds of material may be placed in the bin, and upon operation of the conveyor system, the materials will be thoroughly commingled. This is particularly the case if the conveyor system is operating while the materials are being fed into bin 30 through separate filler pipe 31. If desired, bin 30 may assume other shapes, the form shown being illustrative only.

Bin 30 may be provided with a pair of inlets 31 and 33 in order to accept feed or other materials either from outside the system or from the discharge spout 27. The bottom of bin 30 is provided with a conveyor auger 40 having flights 41 and a shaft 42, which parts occupy a trough which is an extension of auger tube 43, at the bottom of bin 30. A tube section 44 may be provided to join tube 43 with a mating tube 45 which is a branch of T 46. The cross bar of T 46 is tube 47 which serves as a downward extension of the main vertical auger tube 14.

Auger 40 extends into close proximity to auger 10 and serves to feed material from bin 30 into auger conveyor 10. T 46 is free to rotate with respect to tube 14. Bin 30 is mounted on a support 48 which carries a wheel or wheels 49 so that bin 30 may be rotated as desired about the axis of shaft 11. Motor 50 which drives shaft 42 of lateral auger 40 through pulleys 51 and 52 and belt 53 is also supported on support 48 to move with bin 30. A flexible tube 34 is secured to inlet 33 to accommodate the movement of bin 30. Such movement may also be accommodated by rotation of tube 14 and the structure supported thereon by means of handle 35, or by rotation of distributor 60 with respect to tube 14. Distributor 60 is freely rotatably supported on a ring 61 secured to tube 14. Cover 62 of distributor 60 is freely rotatably supported on the side walls 63 of the distributor so that tube 14, collector 25, spout 27, and extension 28 which passes through distributor cover 62 may be rotated independently, if desired. For instance, extension 28 may be aligned with any of a plurality of outlet spouts 64 provided in the bottom 65 of distributor 60. Alignment of the various parts is maintained by side walls 66 of cover 62 which are circular as are side walls 63 of distributor 60.

In the arrangement shown in FIG. 2, the various parts may be the same as those shown in FIG. 1 with the exception that distributor 60 and extension 28 are absent. Either the arrangement of FIG. 1 or FIG. 2 may be used with other bin arrangments and other infeed conveyor arrangements, if desired.

I claim:
1. A vertical auger conveyor having a free discharge head, comprising a substantially vertical auger shaft pro- vided with auger flights, an auger tube concentric with said shaft, and a discharge head, said head comprising a container secured to the upper portion of said tube and a first discharge spout opening from the bottom of said container, said tube having a discharge opening wholly within said container, and extending substantially to the top of the container, said opening extending axially down said tube past at least one full turn of said auger flights, an intermediate portion of said opening extending past a flightless space extending upwardly and axially from the end of said flghts, said space being at least as long as one full turn of said flights.

2. A vertical auger conveyor having a free discharge head, comprising a vertical auger shaft, auger flights on said shaft, an auger tube concentric with said shaft and extending upwardly beyond the end of said flights, a discharge head comprising a container secured to the upper portion of said tube, an opening in the wall of said tube wholly within said container, and a first discharge spout opening from the bottom of said container, said auger flights terminating intermediate the margins of said opening and a substantial distance from the end wall of said tube, said conveyor being provided with a distributing chamber concentric with said tube, a rotatable top for said distributing chamber fixedly secured to said first discharge spout, and a plurality of second discharge spouts fixedly secured to the bottom of said distributing chamber whereby rotation of said tube will align said first discharge spout with one of said plurality of second discharge spouts.

3. The device of claim 2 further comprising a storage bin, a lateral auger conveyor passing through the bottom of said storage bin and open to the contents thereof, said lateral auger conveyor having a discharge opening into said vertical auger conveyor at the bottom end thereof, a duct connecting a discharge spout of said vertical auger conveyor with the top of said storage bin.

4. The device of claim 3 in which said bin is provided with a support, and a wheel mounted on said support, a T at the lower end of said vertical auger having a branch rotatably connected with the tube enclosing said vertical auger, said T having a second branch enclosing the end of said lateral auger conveyor, said T comprising the discharge opening of said lateral conveyor into the lower end of said vertical auger conveyor, said T being rotatable with said lateral auger conveyor independently of said tube enclosing said vertical auger conveyor whereby said bin may be moved in a path concentric with said shaft of said vertical auger.

5. A vertical auger conveyor having a free discharge head, comprising a vertical auger shaft, auger flights on said shaft, an auger tube concentric with said shaft and extending upwardly beyond the end of said flights, a discharge head comprising a container secured to the upper portion of said tube, an opening in the wall of said tube wholly within said container, and a first discharge spout opening from the bottom of said container, said auger flights terminating intermediate the margins of said opening and a substantial distance from the end wall of said tube, said tube enclosing said vertical auger conveyor being mounted for rotation independently of said vertical auger.

References Cited by the Examiner
UNITED STATES PATENTS 2,027,958  1/1936  Carter _____ 198—64
2,100,937  11/1937  Bowe _____ 198—64

EVON C. BLUNK, *Primary Examiner.*

RICHARD E. AEGERTER, *Examiner.*